US012638110B2

(12) United States Patent
Lopez et al.

(10) Patent No.: US 12,638,110 B2
(45) Date of Patent: May 26, 2026

(54) FLUID ADAPTOR

(71) Applicant: CKD Solutions, LLC, Wilmington, NC (US)

(72) Inventors: Keneth Lopez, Mahopac, NY (US); Christopher Lopez, Wilmington, NC (US); Jacob Scott Morrise, Lehi, UT (US)

(73) Assignee: CKD SOLUTIONS, LLC, Wilmington, NC (US)

( * ) Notice: Subject to any disclaimer, the term of this patent is extended or adjusted under 35 U.S.C. 154(b) by 0 days.

(21) Appl. No.: 18/931,805

(22) Filed: Oct. 30, 2024

(65) Prior Publication Data

US 2025/0137561 A1      May 1, 2025

Related U.S. Application Data

(60) Provisional application No. 63/594,742, filed on Oct. 31, 2023.

(51) Int. Cl.
  F16L 37/48      (2006.01)
  F16L 21/00      (2006.01)
(52) U.S. Cl.
  CPC .................................. F16L 21/005 (2013.01)
(58) Field of Classification Search
  CPC ......... F16L 37/48; F16L 21/00; F16L 21/025; F16L 31/00; F16L 33/24; F16L 33/245;
    (Continued)

(56) References Cited

U.S. PATENT DOCUMENTS 2,699,357 A * 1/1955 Roth ....................... B05B 1/044
                                                            285/8
3,211,195 A    10/1965 Porter
                 (Continued)

FOREIGN PATENT DOCUMENTS

CN      212050508 U    12/2020
CN      221104604 U     6/2024
                 (Continued)

OTHER PUBLICATIONS

Boon, Boon Snug Silicone Sippy Cup Lids and Straws—Includes 3 Lids and 3 Straws—Convert Any Kids Cups or Toddler Cups into Straw Sippy Cups, ASIN B08KB5GV3C, https://www.amazon.com/dp/B08KB5GV3C?ref=ppx_yo2ov_dt_b_fed_asin_title&th=1.

*Primary Examiner* — Aaron M Dunwoody
(74) *Attorney, Agent, or Firm* — Simpson & Simpson, PLLC

(57)          ABSTRACT

A fluid adaptor, having a funnel adaptor having a first open end and a second open end, the first open end having a greater diameter than the second open end, a plurality of annular protrusions disposed on an inner surface of the funnel adaptor and arranged between the first open end and the second open end, each of the plurality of annular protrusions having a radius, the radii decreasing from the first open end to the second open end, and an extension tube extending from and integral to the second open end. In some possible configurations of the funnel adaptor, an elongated tube may removably and frictionally engage the second open end. In other possible configurations, each adjacent pair of the plurality of annular protrusions forms an annular channel therebetween.

17 Claims, 5 Drawing Sheets

(58) Field of Classification Search
CPC ......... F16L 35/005; F16L 35/00; F16L 47/00; F16L 47/06; F16L 47/265
USPC .......................................................... 285/8
See application file for complete search history.

(56) References Cited

U.S. PATENT DOCUMENTS

| | | | |
|---|---|---|---|
| 4,217,940 A | | 8/1980 | Wheeler |
| D274,208 S | | 6/1984 | Hildenbrand |
| 5,028,077 A | * | 7/1991 | Hurst ..................... F16L 37/48 285/259 |
| 5,259,535 A | | 11/1993 | Boyte, Sr. |
| D567,038 S | | 4/2008 | Carallo |
| D593,383 S | | 6/2009 | Pallotto et al. |
| D662,794 S | | 7/2012 | Enghard |
| D669,750 S | | 10/2012 | Lee et al. |
| D688,924 S | | 9/2013 | Enghard |
| 9,725,887 B2 | | 8/2017 | Mitchell |
| 2013/0284315 A1 | | 10/2013 | Enghard |

FOREIGN PATENT DOCUMENTS

| | | |
|---|---|---|
| GB | 2433252 A | 6/2007 |
| KR | 20190018990 A | 2/2019 |

* cited by examiner

FLUID ADAPTOR

CROSS-REFERENCE TO RELATED APPLICATIONS

This application claims priority pursuant to 35 U.S.C. 119(e) to U.S. Provisional Patent Application No. 63/594, 742, filed Oct. 31, 2024, which application is incorporated herein by reference in its entirety.

FIELD

The present invention relates to a fluid adaptor capable of mating with a variety of different-diameter container openings.

BACKGROUND

Machinery, engines, gears, and many other like-apparatuses, require different fluids for efficient use. An example would be an automobile engine, having various needs for a plurality of different fluids-oil, transmission fluid, windshield wiper fluid, etc. The reservoirs for these fluids are arranged in and around the main engine of a vehicle, where a mouth for each of reservoirs are tucked between various spaces of engine components. When these reservoirs need to be filled, it can be challenging to reach the particular mouth for the reservoir and in some cases the containers may be quite large (e.g., gallon-sized windshield wiper fluid containers). This makes refilling these reservoirs in the engine more difficult, while the mouth of the reservoir itself typically has a smaller diameter due to the space restrictions in and around an engine.

These fluid containers come in a plurality of volumes, e.g., quarts and/or gallons, etc. The containers themselves can have different sized mouths. Standard mouth sizes are in the approximate range of 25 mm-40 mm-however, smaller or larger sized mouths are also available.

A typical solution for the aforementioned issues is to use a funnel. The funnel, placed within the mouth of the reservoir, essentially enlarges the opening to that reservoir, making it easier to fill with the required fluid. However, this solution does not make it easier for a user to reach these mouths, it only makes the opening larger. Secondly, funnels essentially rest within the mouth of the reservoir and can be knocked loose, fall out, etc., if the fluid is poured too quickly or aggressively.

Thus, there is a desire to solve two primary issues. The first, is to provide a device that makes accessing a mouth of a reservoir within an engine easier for pouring a fluid and the second, is to provide an adaptor for the fluid containers themselves, to make pouring the fluid into the mouth simpler—similar to the functionality of a funnel.

Therefore, there is a long-felt need for a fluid container adaptor that extends the reach of the fluid pathway of the container to a mouth of a reservoir and that also substantially creates a fluid pathway between the container and the reservoir, i.e., a fluid pathway.

Finally, a desirable adaptor for a fluid container needs to be able to fit a plurality of different mouth sizes of fluid containers without the need for additional components to accommodate the different sizes, i.e., additional "sub-adaptor" pieces. As such, there is long-felt need for an adaptor that can engage a plurality of different-sized fluid container openings in a removable and sealable manner, where the adaptor includes a plurality of different-sized sealing members extending from an inner surface of the adaptor that can engage one of said fluid container openings.

SUMMARY

At the outset, the reference numerals provided herein are merely exemplary and should not be considered restrictive of the scope of the appended claims.

The present invention is generally related to a fluid adaptor (10), comprising a funnel adaptor (24) having a first open end (12 and/or 20) and a second open end (14 and/or 22), the first open end (20) having a greater diameter than the second open end (22), a plurality of annular protrusions (28-44) disposed on an inner surface (18) of the funnel adaptor (24) and arranged between the first open end (12 and/or 20) and the second open end (14), each of the plurality of annular protrusions (28-44) having a radius, the radii decreasing from the first open end (12 and/or 20) to the second open end (14), and an extension tube (26) extending from and integral to the second open end (14).

In some embodiments, the fluid adapter (10) may further comprise an elongated tube (70) arranged to be frictionally secured within the extension tube (26) of the funnel adaptor (24).

In other configurations, the funnel adaptor (24) is arranged to frictionally and removably surround at least a portion of an opening of a fluid container.

In some arrangements, each of the plurality of annular protrusions (28-44) comprise a distal edge extending from the inner surface (18), a proximal edge extending from the inner surface, and, a medial edge substantially perpendicular and connect to both of the distal edge and the proximal edge, wherein the medial edge is angled towards the first end (12 and/or 20).

In other embodiments, an adjacent pair of the plurality of annular protrusions (28-44, 64) forms a channel (46-62) therebetween.

In further aspects, the present invention could comprise a fluid adaptor having a funnel adaptor having a first open end and a second open end, the first open end having a greater diameter than the second open end; and, a plurality of annular protrusions disposed on an inner surface of the funnel adaptor and arranged between the first open end and the second open end, each of the plurality of annular protrusions having a diameter, the diameters having a decreasing radius from the first open end to the second open end, wherein each adjacent pair of the plurality of annular protrusions forms an annular channel therebetween.

In some embodiments, the aforementioned fluid adaptor may further include an extension tube extending from and integral to the second open end.

In other configurations, each of the plurality of annular protrusions of one of the aforementioned fluid adaptor may comprise: a distal edge extending from the inner surface; a proximal edge extending from the inner surface; and, a medial edge substantially perpendicular and connected to both of the distal edge and the proximal edge, wherein the medial edge is angled towards the first end.

In other embodiments, the funnel adaptor of one of the aforementioned fluid adaptor is arranged to frictionally and removably surround at least a portion of an opening of a fluid container.

In one possible arrangement of one of the aforementioned fluid adaptor, each annular channel form by each adjacent pair of the plurality of annular protrusions has a diameter, the diameters having a decreasing radius from the first open end to the second open end.

These and other objects, features, and advantages of the present invention will become readily apparent upon a review of the following detailed description of the invention, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
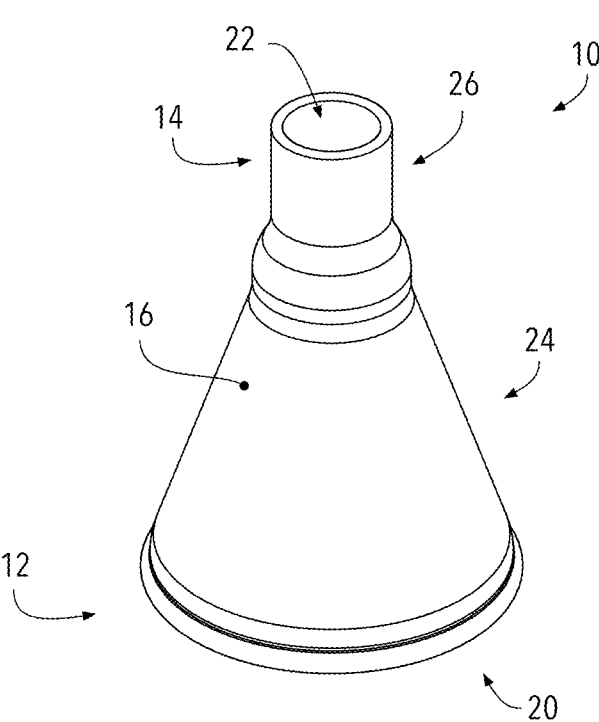
FIG. 1 illustrates a top perspective view of the present invention.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims. As such, those in the art will understand that any suitable material, now known or hereafter developed, may be used in forming the present invention described herein.

Unless defined otherwise, all technical and scientific terms used herein have the same meaning as commonly understood to one of ordinary skill in the art to which this disclosure pertains. It should be understood that any methods, devices or materials similar or equivalent to those described herein, or understood to one having skill in the art within, can be used in the practice or testing of the example embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The terms, "having", "has", "including", "includes" are intended to be substantially synonymous with the terms "comprising" and/or "comprises" and/or "comprise".

It should be appreciated that the term "substantially" is synonymous with terms such as "nearly," "very nearly,"

"about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" or "one of:" is used herein.

The phrases "fluid connection" and/or "fluidly connected" and/or "fluid communication" and similar derivatives, are intended to mean that two components, e.g., component X and component Y, are connected such that liquids and/or gases may travel therebetween in a closed circuit, i.e., component X and component Y are in fluid communication such that fluid and/or gas may flow into component X and out of component Y, vice versa.

Figure 2:
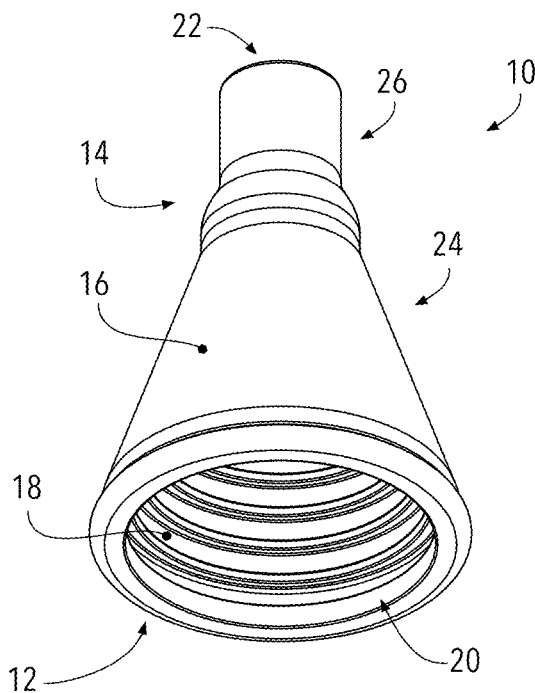
FIG. 2 illustrates a bottom perspective view of the invention shown in FIG. 1.
Figure 3:
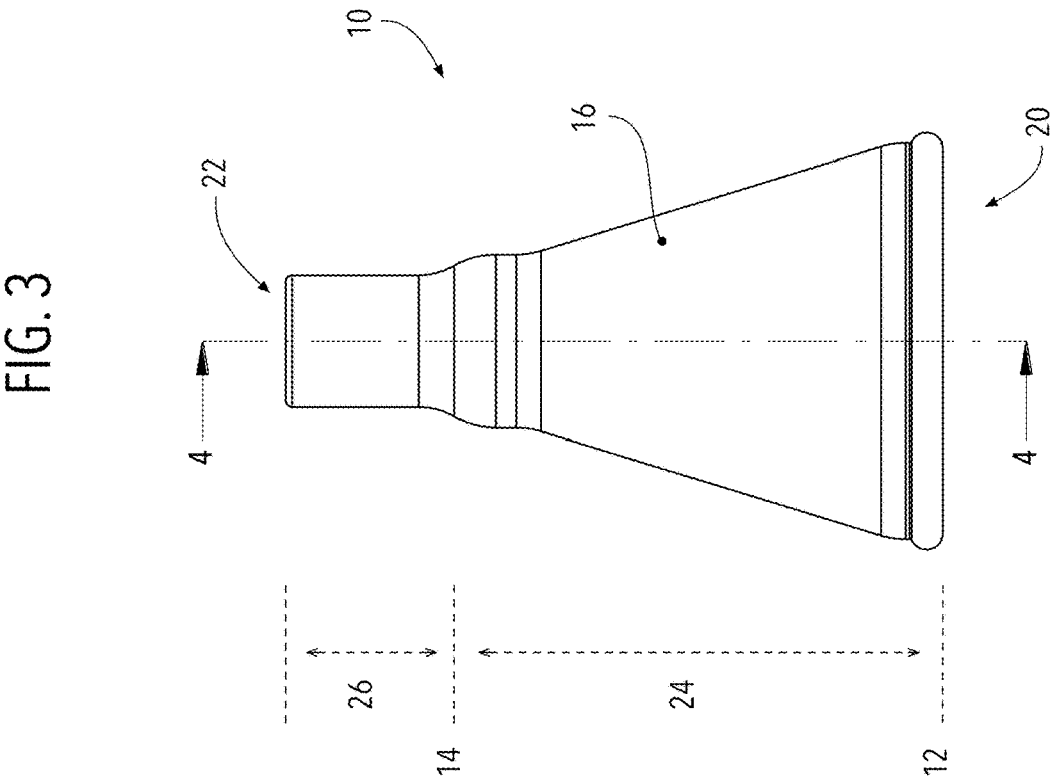
FIG. 3 illustrates a front view of the invention shown in FIG. 1.

Adverting now to the figures, FIGS. 1 through 3 illustrate a top perspective view, a bottom perspective view, and a front view of the present invention, respectively. Generally, fluid adaptor 10 has first end 12, second end 14, outer surface 16, and inner surface 18. Preferably, fluid adaptor 10 has two main sections, funnel portion 24 and extension tube 26, where extension tube 26 extends from second end 14 of funnel portion 24 and is integral thereto. Fluid adaptor 10 has two openings, first opening 20 arranged within first end 12 and second opening 22 arranged within extension tube 26. In some arrangements, a diameter of first opening 20 is greater than a diameter of second opening 22. Thus, in a preferred embodiment, fluid adaptor 10 has a substantially funnel-like configuration and funnel portion 24 is substantially frustoconical and hollow.

Figure 4:
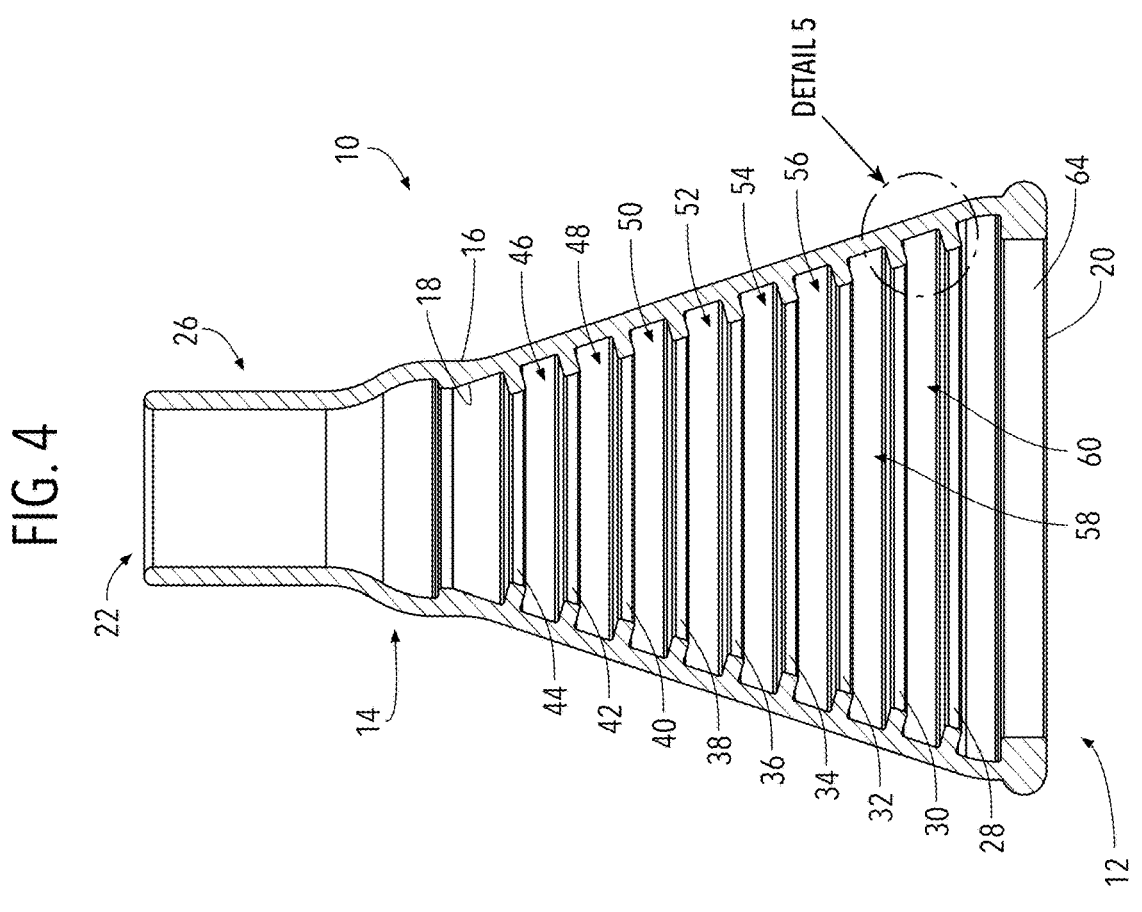
FIG. 4 illustrates a cross-sectional view taken generally along line 4-4 in FIG. 3.

FIG. 4 shows a cross-sectional view of fluid adaptor 10 taken generally along line 4-4 in FIG. 3. A plurality of annular protrusions, annular protrusions 28-44, extend from inner surface 18 of funnel portion 24 between first end 12 and second end 14. In a preferred arrangement, the radii of annular protrusions 28-44 decreases from first end 12 to second end 14. In other words, annular protrusion 28 has a greater radius than annular protrusions 30-44, annular protrusion 30 has a greater radius than annular protrusions 32-44, etc. Distal annular protrusion 64 substantially defines first opening 20. Annular channels 46-60 are formed between each of annular protrusions 28-44 and distal annular channel 62 is formed between annular protrusion 28 and distal annular protrusion 64. It should be noted that annular protrusions 30-44 may be configured in a rounded and/or curved arrangement, i.e., substantially similar to annular rings with a substantially circular cross-section extending from inner surface 18.

Generally, annular protrusions 28-44, are individual sealing members, each having a different radius and/or diameter, allowing one or more of the plurality of annular protrusions to sealably engage an outer surface of a fluid container opening.

Figure 5:
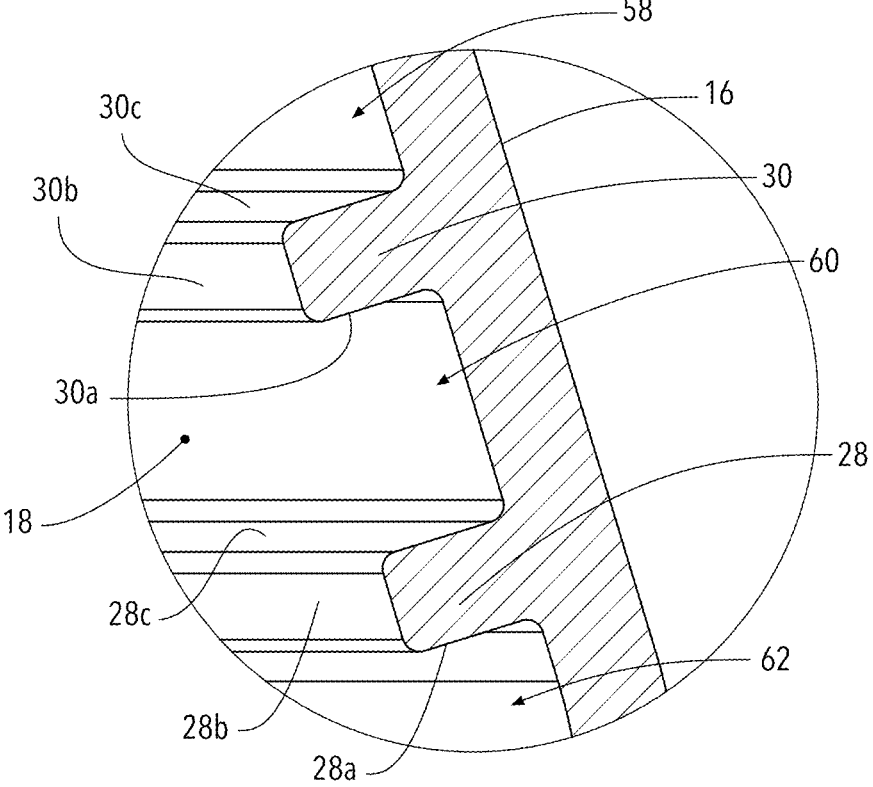
FIG. 5 illustrates an enlarged view taken generally from DETAIL 5 in FIG. 4.

FIG. 5 is an enlarged view taken generally from DETAIL 5 in FIG. 4—illustrating annular protrusions 28 and 30. Annular protrusions 28 and 30 are substantially adjacent to one another and bounded therebetween is channel 60. Annular protrusion 28 includes distal edge 28a, proximal edge 28c and medial edge 28b connected therebetween. Annular protrusion 30 includes distal edge 30a, proximal edge 30c and medial edge 30b connected therebetween. Thus, annular channel 60 is defined by proximal edge 28c of annular protrusion 28 and distal edge 30a of annular protrusion. As shown, medial edges 28b and 30b are angled in directions towards the first end or first opening of funnel portion 24. However, it is preferable that the protrusions are angled towards the first end and/or first opening, regardless of the particular shape they may take.

Figure 6:
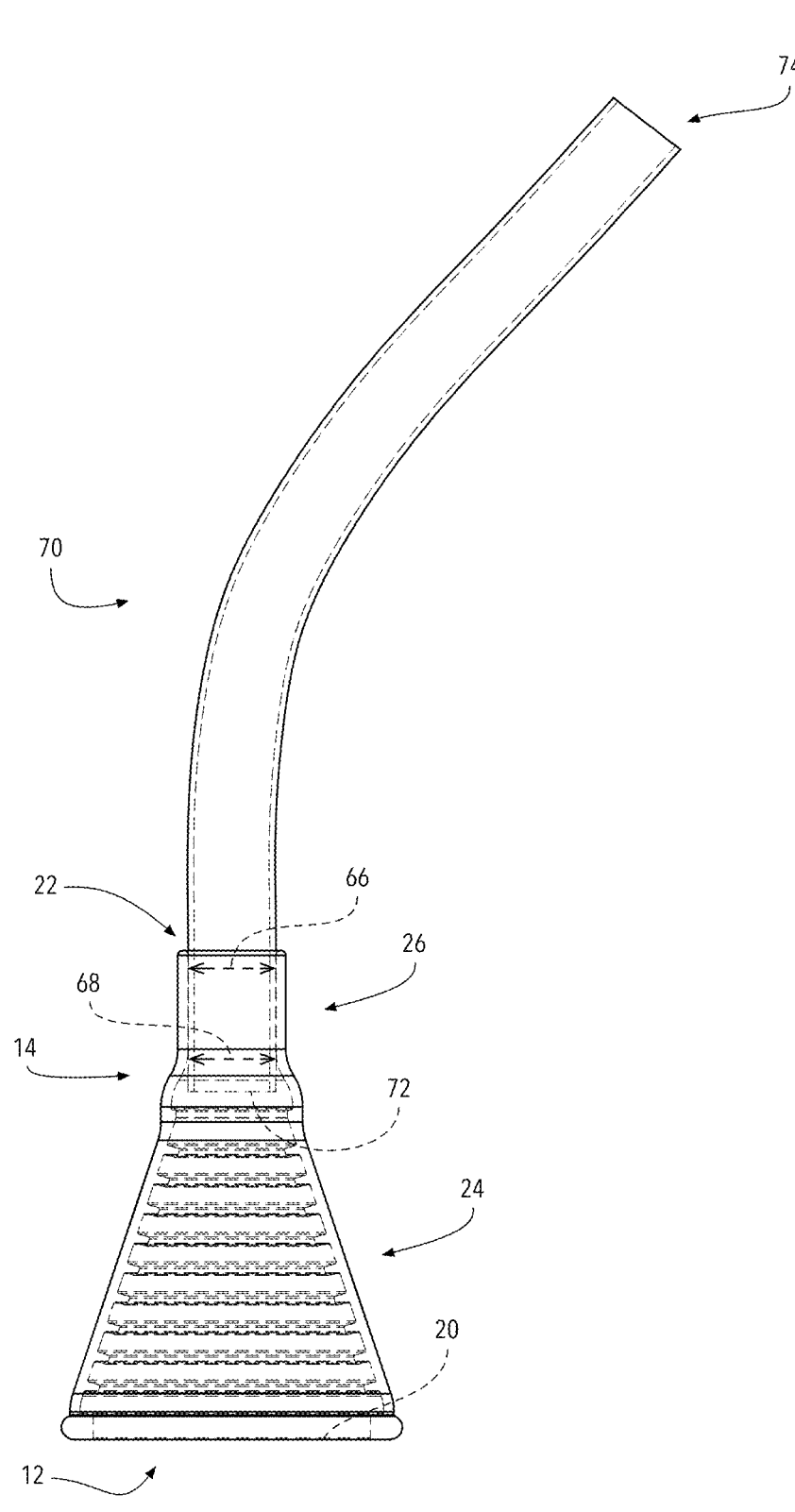
FIG. 6 illustrates a skeleton perspective view of the present invention and an elongated tube attached thereto; and, FIG. 7 illustrates a view of the present invention in use.

FIG. 6 is a skeleton perspective view of fluid adaptor 10 having first end 72 of elongated tube 70 arranged within extension tube 26. In a preferred embodiment, elongated tube 70 has an outer diameter which is larger than an inner diameter of extension tube 26, and at least extension tube 26 of fluid adaptor 10 is comprised of a semi-flexible material such that extension tube 26 may be deformably stretched over an outer surface of elongated tube 70 to create a frictionally-secured and removable fluid connection between funnel portion 24, extension tube 26, and elongated tube 70. In other words, second end 74 of elongated tube 70 and first end 12 and/or first opening 20 of funnel portion 24 are in fluid communication. In some embodiments, first diameter 66 of extension tube 26, proximate second opening 22 may be greater than second diameter 68 of extension tube 26, proximate second end 14—allowing an enhanced frictional-grip on an objection (e.g., elongated tube 70) therein, thereby improving the aforementioned fluid connection. In other arrangements, elongated tube 70 may have a ventilation aperture arranged therein, which may be removably sealed and/or unsealed to improve fluid flow from first end 20 to second end 74, where in other arrangements the ventilation aperture could be configured as a one-way valve.

Figure 7:
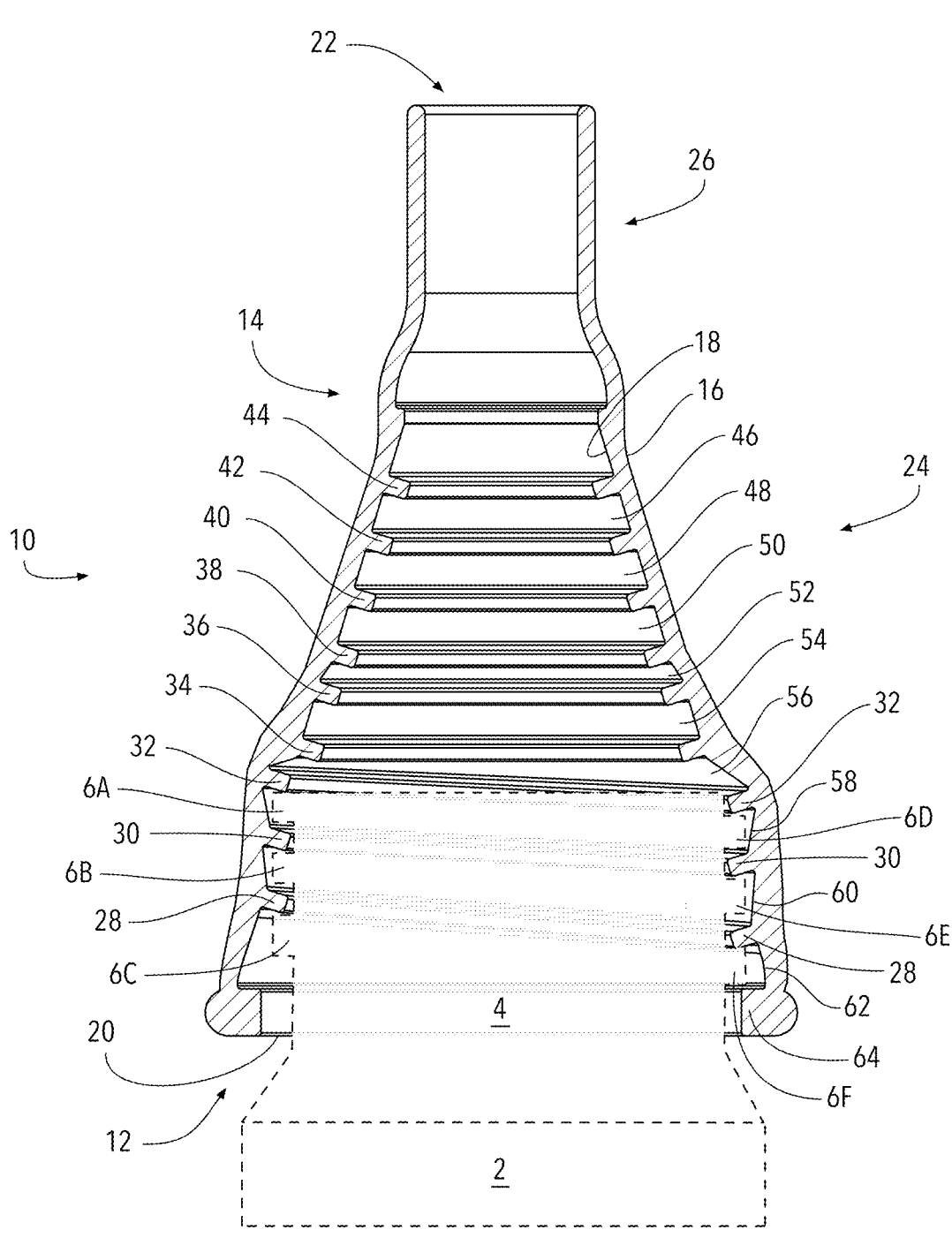

FIG. 7 shows a cross-sectional view of fluid adaptor 10 (taken generally along line 4-4 in FIG. 3) in use, specifically, funnel portion 24 engaging mouth 4 of fluid container 2. Fluid container 10, generally illustrated by the broken lines, includes mouth 4 having threading 6A-6F extending therefrom. It should be noted that the threading is merely exemplary to depict the function imparted by the specific structural configuration of fluid adaptor 10 and should not be considered restrictive on the appending claims.

As generally illustrated, funnel portion 24 of fluid adaptor 10 is frictionally and deformably surrounding at least a portion of mouth 4 of container 2. As shown, some of the plurality of annular protrusions will abut respective surfaces of threads 6A-6F, e.g., annular protrusion 32 abuts thread 6A and thread 6D, annular protrusion 30 abuts thread 6B and thread 6E, annular protrusion 28 abuts thread 6C and thread 6F. In other words, threads 6A-6F are substantially seated within at least one of annular channels 46-60 and/or distal annular channel 62. Since both the annular protrusions and funnel portion 24 are deformable, i.e., viscoelastically constructed, the annular protrusions proximate first end 12 and first opening 20 of funnel portion 24 may be stretched over mouth 4 of container 2, thereby removably and frictionally engaging mouth 4 in fluid communication with first opening 20 of funnel portion 24 of fluid adaptor 10. To improve the fluid connection shown in FIG. 7, mouth 4 of container 2 may be forcibly slid in the direction of second end 14 within funnel portion 24, thereby engaging more of annular protrusions 28-44.

In reference to the aforementioned description and drawings, it should be noted that, in a preferred embodiment, fluid adaptor 10 is comprised of at least a semi-flexible material, e.g., rubber-like compositions, silicon, elastomers, and the like, in other words, materials that possess viscoelastic properties (exhibiting both viscous and elastic nature under deformation) and/or elastic properties. In other words, the material choice must have characteristics that allow fluid adaptor to expand under force and retract when said force is removed, while maintaining fluid-tightness therein.

In view of all of the aforementioned embodiments, it should be noted that in alternative arrangements, elongated tube 70 may be integrally connected to fluid adaptor 10.

It should be noted that the various embodiments disclosed herein, may be arranged in various combinations according to any of the embodiments shown and described. As such, the shown and described embodiments are merely exemplary and various alternatives, combinations, omissions, of specific components, or foreseeable alternative components, understood by one having ordinary skill in the art, described in the present disclosure or within the field of the present disclosure, are intended to fall within the scope of the appending claims.

It will be appreciated that various aspects of the invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

2 Fluid container
4 Mouth
6A-6F Threading
10 Fluid adaptor
12 First end
14 Second end

16 Outer surface
18 Inner surface
20 First opening
22 Second opening
24 Funnel portion
26 Extension tube
28-44 Annular protrusions
28*a* Distal edge
28*b* Medial edge
28*c* Proximal edge
30*a* Distal edge
30*b* Medial edge
30*c* Proximal edge
46-60 Annular channels
62 Distal annular channel
64 Distal annular protrusion
66 First diameter of 26
68 Second diameter of 26
70 Elongated tube
72 First end
74 Second end

What is claimed is:

1. A fluid adaptor, comprising:
a funnel adaptor having a first open end and a second open end, the first open end having a greater diameter than the second open end;
a plurality of annular protrusions disposed on an inner surface of the funnel adaptor and arranged between the first open end and the second open end, each of the plurality of annular protrusions having a diameter, the diameters having a decreasing radius from the first open end to the second open end, each of the plurality of annular protrusions comprise;
a distal edge extending from the inner surface:
a proximal edge extending from the inner surface; and
a medial edge substantially perpendicular and connect to both of the distal edge and the proximal edge, wherein the medial edge is angled towards the first end; and,
an extension tube extending from and integral to the second open end.

2. The fluid adaptor recited in claim 1 further comprising an elongated tube arranged to be frictionally secured within the extension tube of the funnel adaptor.

3. The fluid adaptor recited in claim 2, wherein at least one of: the funnel adaptor; the plurality of annual protrusions; the extension tube; and the elongated tube, are comprised of a flexible material.

4. The fluid adaptor recited in claim 1, wherein at least one of: the funnel adaptor; the plurality of annual protrusions; and, the extension tube, are comprised of a flexible material.

5. The fluid adaptor recited in claim 4, wherein the funnel adaptor is arranged to frictionally and removably surround at least a portion of an opening of a fluid container.

6. The fluid adaptor recited in claim 1, wherein the plurality of annular protrusions are comprised of a flexible material.

7. The fluid adaptor recited in claim 1, wherein both of the plurality of annular protrusions and the extension tube are comprised of a flexible material.

8. The fluid adaptor recited in claim 1, wherein an adjacent pair of the plurality of annular protrusions forms an annular channel therebetween.

9. The fluid adaptor recited in claim 8, wherein each annular channel form by each adjacent pair of the plurality of annular protrusions has a different radius.

10. The fluid adaptor recited in claim 8, wherein each annular channel form by each adjacent pair of the plurality of annular protrusions has a diameter, the diameters having a decreasing radius from the first open end to the second open end.

11. A fluid adaptor, comprising:
a funnel adaptor comprised of a flexible material, the funnel adaptor having a first open end and a second open end, the first open end having a greater diameter than the second open end;
a plurality of flexible annular protrusions disposed on an inner surface of the funnel adaptor and arranged between the first open end and the second open end, each of the plurality of annular protrusions having a radius, the radii having a decreasing radius from the first open end to the second open end, each of the plurality of annular protrusions comprise;
a distal edge extending from the inner surface:
a proximal edge extending from the inner surface; and,
a medial edee substantially perpendicular and connect to both of the distal edge and the proximal edge, wherein the medial edge is angled towards the first end;
a flexible extension tube extending from and integral to the second open end; and,
an elongated tube arranged to be frictionally secured within the extension tube.

12. The fluid adaptor recited in claim 11, wherein the funnel adaptor is arranged to frictionally and removably surround at least a portion of an opening of a fluid container.

13. The fluid adaptor recited in claim 11, wherein an adjacent pair of the plurality of annular protrusions forms an annular channel therebetween.

14. A fluid adaptor, comprising:
a funnel adaptor having a first open end and a second open end, the first open end having a greater diameter than the second open end; and,
a plurality of annular protrusions disposed on an inner surface of the funnel adaptor and arranged between the first open end and the second open end, each of the plurality of annular protrusions having a diameter, the diameters having a decreasing radius from the first open end to the second open end, wherein each adjacent pair of the plurality of annular protrusions forms an annular channel therebetween, each of the plurality of annalar protrusions comprise:
a distal edge extending from the inner surface:
a proximal edge extending from the inner surface; and,
a medial edge substantially perpendicular and connect to both of the distal edge and the proximal edge, wherein the medial edge is angled towards the first end.

15. The fluid adaptor recited in claim 14 further comprising:
an extension tube extending from and integral to the second open end.

16. The fluid adaptor recited in claim 14, wherein the funnel adaptor is arranged to frictionally and removably surround at least a portion of an opening of a fluid container.

17. The fluid adaptor recited in claim 14, wherein each annular channel form by each adjacent pair of the plurality of annular protrusions has a diameter, the diameters having a decreasing radius from the first open end to the second open end.

* * * * *